Sept. 3, 1935.  J. P. LEINDORF  2,013,058
MOUNTING FOR BIRD CAGE PERCHES
Filed March 15, 1934
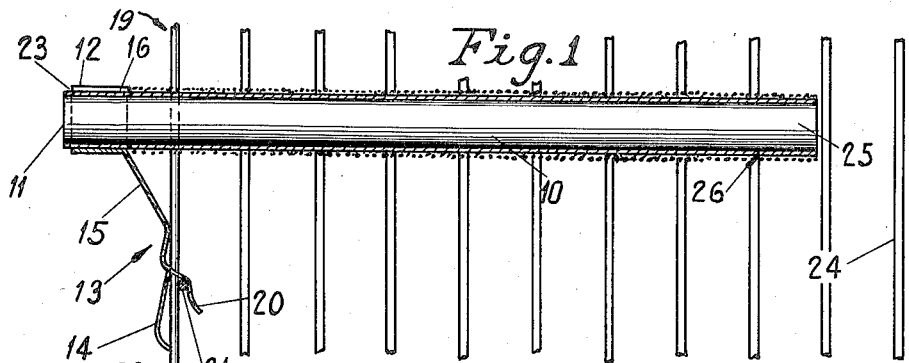
Fig.1
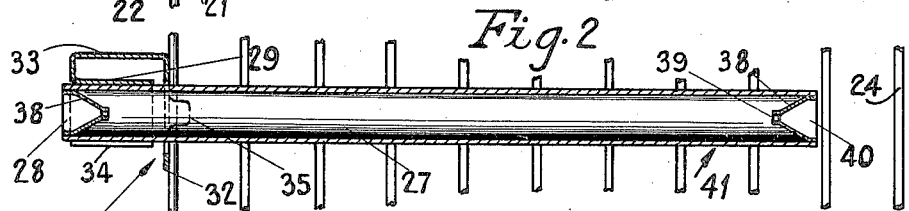
Fig.2
Fig.3
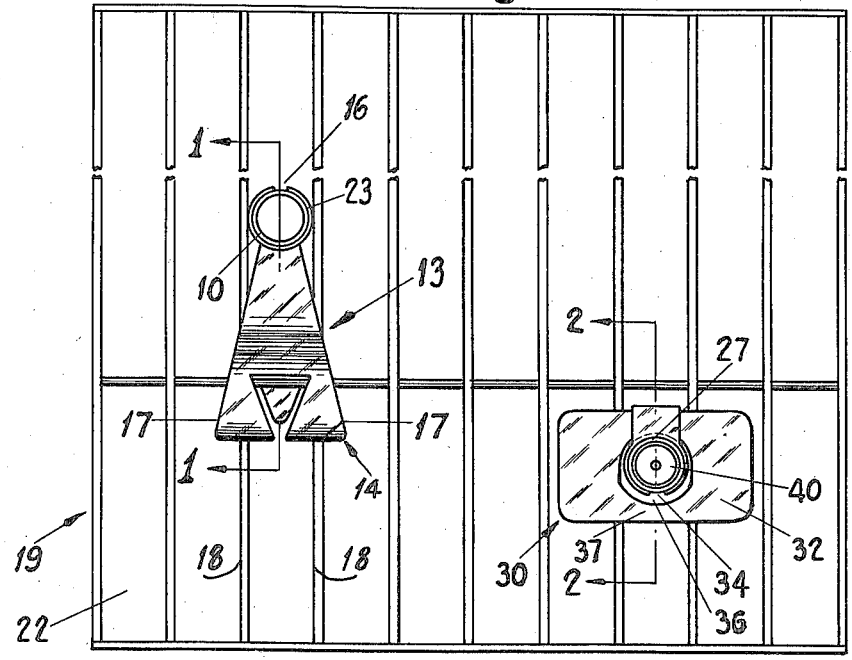
Fig.4
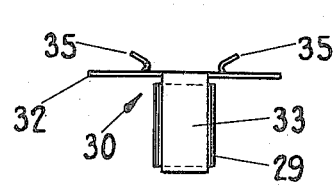
INVENTOR.
JOSEPH P. LEINDORF
BY Joseph Blacker
ATTORNEY Patented Sept. 3, 1935

2,013,058

UNITED STATES PATENT OFFICE 2,013,058

MOUNTING FOR BIRD CAGE PERCHES

Joseph P. Leindorf, Pelham Manor, N. Y.

Application March 15, 1934, Serial No. 715,592

2 Claims. (Cl. 119—26)

This invention relates to an overhanging or cantilever perch for bird cages.

An object of this invention is to provide an overhanging perch which may be attached to the cage from the outside and held in frictional engagement.

Another object of this invention is to provide a resilient mounting for tubular perches, the said mounting having a tubular perch-gripping portion at one end and a wire-gripping portion at the other end, and an elongated intermediate portion, the said elongated portion serving to provide a resilient effect.

Another object of this invention is to provide a resilient and vibratable one-piece mounting for tubular perches, the said mounting being designed to grip one end of a perch in frictional engagement and to permit the free end of the perch to vibrate up and down.

Another object of this invention is to provide a tubular perch mounting, designed to grip one end of the perch while permitting the free end to swing up and down, the said mounting having a fixed ring portion spaced from the lower surface of the perch and adapted to limit the downward swing of said perch.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a longitudinal sectional view of a tubular perch secured at one end in a resilient mounting, the mounting being secured to a horizontal wire of a bird cage, the section being taken as on line 1—1 in Figure 3.

Figure 2 is a longitudinal sectional view of a combined tubular perch and mite trap secured at one end in a resilient mounting different from that shown in Figure 1, the mounting being secured to two vertical wires of a bird cage, the section being taken as on line 2—2 in Figure 3.

Figure 3 is a front elevation of a bird cage having the perches shown in Figures 1 and 2 secured thereto.

Figure 4 is a top view of the mounting shown in Figure 2, designed for attachment to two vertical wires.

In the illustrated embodiment of the invention, Figure 1 shows a tubular perch 10 secured in frictional engagement at one end 11 in a tubular end portion 12 of a mounting 13. The mounting 13 comprises the perch-gripping tubular end portion 12, a wire-gripping end portion 14, and an elongated and resilient intermediate portion 15, which is in angular relation with the said wire-gripping portion. The tubular end portion 12 is split at 16 so that it may be squeezed and adjusted to clamp the outer surfaces of tubular perches of varying sizes. The wire-gripping end portion 14 comprises two exterior arms 17, 17, adapted for engagement with two vertical wires or bars 18, 18 of a cage 19 and an interior arm 20 adapted to straddle and rest upon a horizontal wire or rail 21. The said exterior and interior arms are spaced apart a distance less than the horizontal overall distance between a vertical wire 18 and a horizontal rail 21 so as to be forced apart when in engagement with said wires. The said arms thus exert a frictional gripping pressure on the wires and hold the mounting 13 securely attached to the vertical wall 22 of the cage 19.

The end portion 12 of the mounting 13 is provided with a through aperture 23 which permits the perch 10 to be adjusted lengthwise into the cage 19 from the outside and in spaced relation with the rear wall 24 of the cage, so that the overhanging portion in the cage may be of any desired length. The perch 10 is thus fixedly mounted at the end 11 and is free to swing or vibrate at the end 25, due to the resilient effect produced by the elongated intermediate portion 15 of the mounting 13. The outer surface of the perch 10 may be covered with an abrasive material such as sand 26 which provides a firm grip for the bird.

As shown in Figure 2, there has been provided a tubular perch 27 secured in frictional engagement at one end 28, in a tubular end portion 29 of a mounting 30. The mounting 30 comprises a perch-gripping tubular end portion 29, a wire-gripping portion 32 and an elongated and resilient intermediate portion 33, which is in angular relation with the said wire-gripping portion 32. The tubular end portion 29 is split at 34 and is adjustable for gripping the outside surface of the perch 27. The wire-gripping end portion 32 comprises two angular arms 35, 35, designed to enter between and to slightly spread apart two vertical wires. The reaction of the bent wires causes a frictional pressure to be exerted against the arms and holds the mounting 30 clamped on the bird cage. It is thus possible by using the mounting 30 to secure a perch between any two vertical wires of the cage at any desired elevation.

As shown in Figure 3, the wire-gripping end portion 32 is provided with an aperture 36 forming an integral ring-shaped cross-bar 37 which is positioned below the lower surface of the perch 27 and serves to limit the downward swing of the perch.

As shown in Figure 2, each end portion of the tubular perch 27 is provided with a hollow conical closure member 38, forming a combined perch and mite trap 41. The members 38 are made of metal and are tightly seated in the perch 27. Each member 38 is provided with a small central aperture 39 at the smaller end of the cone, and is positioned with the smaller end portions facing inwardly of the perch. The vermin from the cage will crawl into the perch 27 through the large apertures 40 at the larger ends of the cones. The apertures 39 are located along the axis of the perch and are removed from the inner surface of the perch, thus confusing the vermin when trying to locate the apertures for escaping from the trap. The conical closures 38 thus increase the difficulty involved for the vermin in emerging from the combined perch and trap 41. The tubular perch 27 of the combined perch and trap 41 is preferably made of cardboard or pasteboard at a low cost so that it may be discarded daily. The owner of the bird may thus discard the vermin infested perch and rid the bird of its irritating enemies.

The perches supported in the mountings 13 and 30 are adjustable from the outside of the cage, thereby avoiding any disturbances to the bird. This exterior adjustment feature is especially desirable for breeding birds during the time of incubation. The mounting 30 is especially adapted for adjusting the perch 27 at the lower part of the cage 19 conveniently accessible to the water and food cups.

After the bird and cage have been rid of the vermin, any kind of a perch such as a solid wooden perch may be inserted in the mountings herein described, inasmuch as the mountings are adjustable and adaptable for perches of different diameters.

Having thus described my invention, what I claim is:

1. A vibratable cantilever mounting for bird cage perches, comprising a tubular perch-gripping end portion positioned outside a cage, a second end portion and a resilient intermediate portion, said tubular end portion being split longitudinally and having a through aperture to permit said perch to be gripped and adjusted lengthwise into or out of said cage from the exterior, said intermediate portion being in angular relation with said wire-gripping portion, said mounting being attachable and frictionally held on any two vertical wires of a cage in various adjusted positions on said cage by means of angular arms on said second end portion designed to enter between and force apart two vertical wires of said cage.

2. A vibratable cantilever mounting for bird cage perches, comprising a tubular perch-gripping end portion positioned outside a cage, a frictional wire-gripping end portion, and a resilient intermediate portion, said intermediate portion being in angular relation with said wire-gripping portion, said wire-gripping portion being apertured and having a lower cross-bar forming the lower edge of the aperture, said cross-bar being spaced from the lower surface of the perch to limit the downward swing of said perch.

JOSEPH P. LEINDORF.